May 3, 1932. J. J. METCALF 1,856,350
VALVE CONTROL
Filed July 14, 1930 2 Sheets-Sheet 2

INVENTOR:
John J. Metcalf
BY O O Martin
ATTORNEY.

Patented May 3, 1932

1,856,350

UNITED STATES PATENT OFFICE

JOHN J. METCALF, OF NATIONAL CITY, CALIFORNIA, ASSIGNOR TO MAGIC WAY GAS HEATING APPLIANCES, INC., OF NATIONAL CITY, CALIFORNIA, A CORPORATION OF DELAWARE

VALVE CONTROL

Application filed July 14, 1930. Serial No. 467,719.

The invention hereinafter set forth has relation to electrical valve controlling means, and more particularly to a device, operable from a remote station, to open and close a valve.

The general object of this invention is to provide a simple and inexpensive valve operating device. More specifically my object is the provision of electrically operated means for reciprocating a valve opening and closing member, in combination with mechanical means for regulating the opening of the valve. Another object is to provide devices, controlled by said mechanical regulating means, for indicating the various operating positions of the valve.

In the drawings hereto appended a structure, embodying the invention, is fully illustrated. In the drawings.

Figure 1:
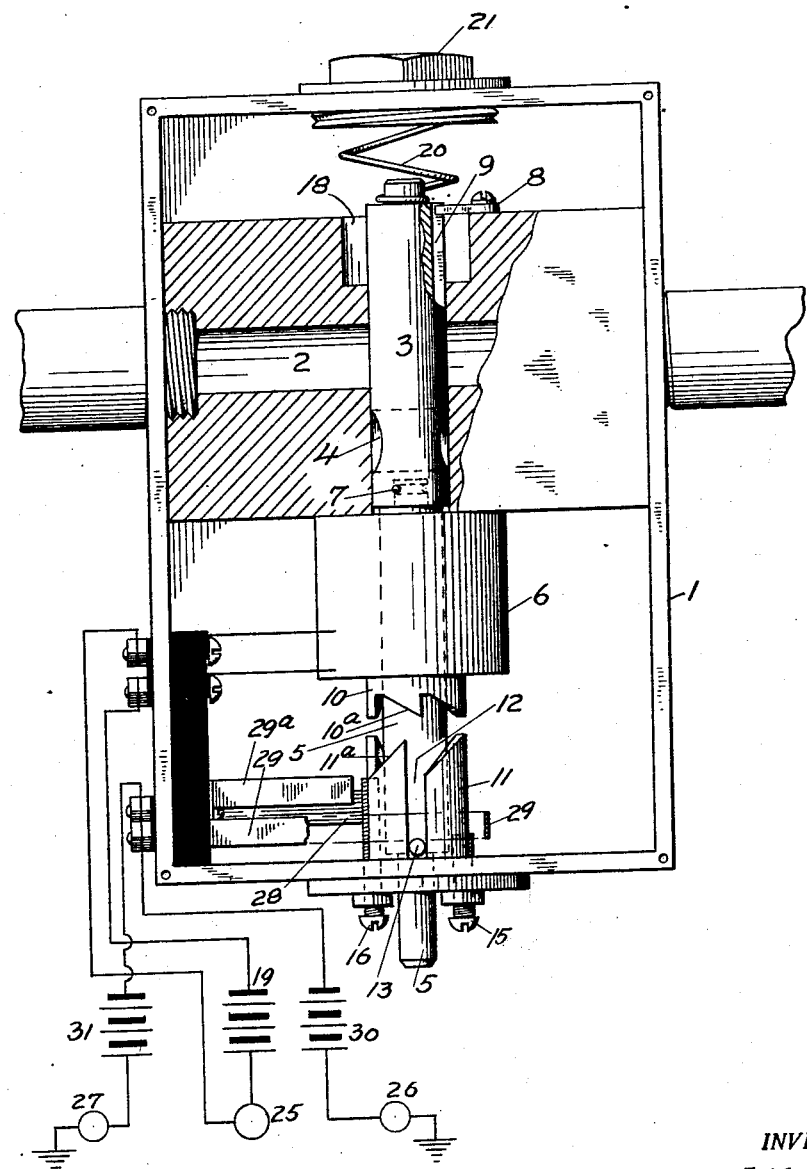
Fig. 1 is a front elevation of the structure of my invention, having the front cover plate removed in order to expose the interior mechanism.

For the purpose of clearly describing my invention, it is hereinafter shown embodied in the fuel supply system of a house heating apparatus. The valve control proper comprises a casing 1, provided with a transverse fuel passage 2. A cylindrical valve stem 3 is mounted to slide vertically within the casing, and it is made with a port 4 for registration with the fuel passage 2. The valve stem is at the bottom provided with a concentric socket, in which a plunger 5, of a solenoid magnet 6, is seated. This plunger is free to rotate within the valve stem and it may, if desired, be locked against longitudinal movement relative to the valve stem by a pin 7, of the stem, riding in an annular groove of the plunger. The valve stem is held against rotation in any suitable manner, the means illustrated comprising a finger 8, of the casing, riding in a groove 9 of the valve stem.

The lower portion of the valve stem 5 is shown riding in two cylindrical sleeves 10, 11, the sleeve 10 being shown rigidly secured to the magnet 6 and the sleeve 11 is suitably clamped in position on the base of the casing. These members are shown crenelated, each member being provided with four teeth, and it is important to note that the teeth of the two members are beveled in opposite directions and that, in the member 11, narrow slots 12 extend from the beveled crown to the bottom of the casing.

In the plunger 5 is seated a pin 13, of a size to fit the aforenamed slots 12, substantially as shown. Each time the magnet 6 is energized, the plunger 5 is drawn upward, pushing the stem 3 upward and causing the port 4 to move into registration with the fuel passage 2. Now it is noticed that the teeth of the member 10 are not in line with the teeth of sleeve 11, but sufficiently advanced to cause the pin 13, as the plunger rises, to strike the bevel 10a of the member 10, and to ride upward on this bevel, thereby rotating the plunger 5 slightly. When the current through the magnet is again disrupted, it is seen that the pin 13 will drop on to the incline 11a and slide into the next following slot 12a.

From the foregoing description it is seen, by those versed in the art, that the plunger and valve stem are drawn upward and each time the magnet is energized, and that the plunger is given a quarter turn at each impulse. In the base are seated stop screws 15, 16, 17, each of which projects into a slot of the member 11. As illustrated the slot 12 is unobstructed, permitting the plunger and stem to drop far enough to bring the port 4 entirely below the passage 2, thereby closing the valve. The screw 16 is shown advanced far enough into the slot 12a to arrest the valve stem with the port 4 in complete registration with the passage 2, and the valve is fully open.

Figure 2:
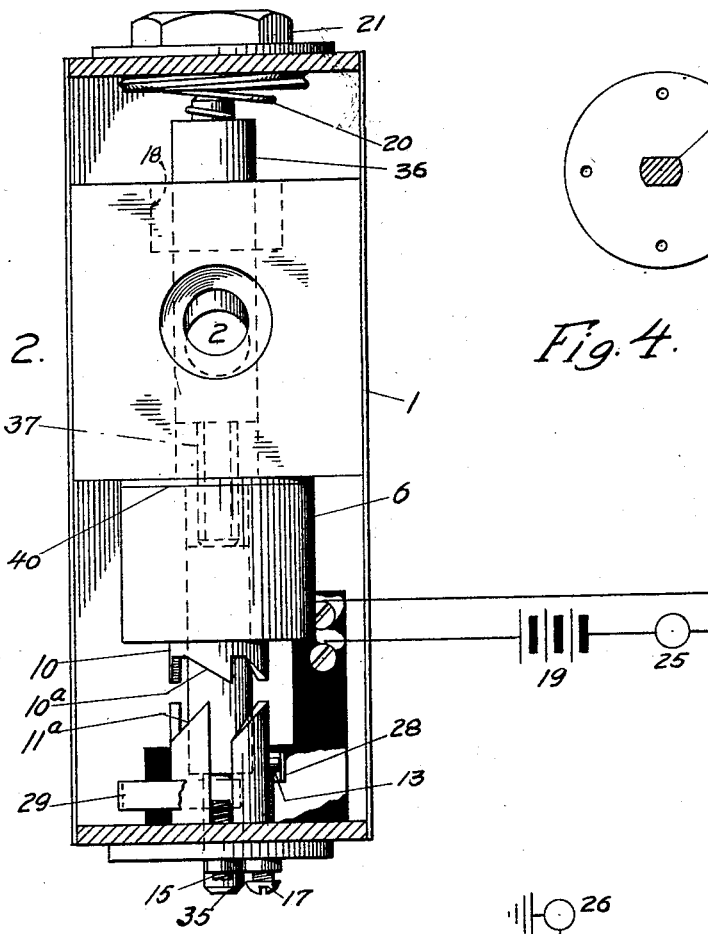
Fig. 2 is a side elevation, substantially in agreement with the foregoing view, and with parts broken away for the sake of clearness.

The screw 17 is not quite so far advanced, permitting the stem to drop into a position of perhaps two-thirds registration, as indicated in Fig. 2, and the screw 17 is adjusted to hold the valve about one-third open.

It is seen from the foregoing, that the size of the passage through the valve may be controlled by adjusting the aforenamed three stop screws 15, 16, 17. The plunger 5 and the valve stem 3 are quite heavy and may be depended upon to drop by gravity. I prefer, however, to increase this force, and to this end I provide a spring 20, bearing against the top of the valve stem. In order further to insure the proper movement of the stem and plunger I may provide means for adjusting the tension of this spring. The means illustrated consists of a screw cap 21, and this cap should be large enough in diameter to permit of withdrawing the stem and plunger after the finger 8 and pin 12 have been removed.

The valve body is at the top shown counter bored, providing in this manner a cylindrical chamber 18, which may be filled with a heavy lubricant, capable of maintaining the valve stem properly lubricated for a long period of time.

Figure 4:
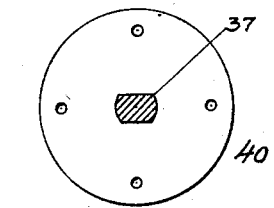
Fig. 4 shows a detail of the mechanism illustrated in Fig. 2.
Figure 3:
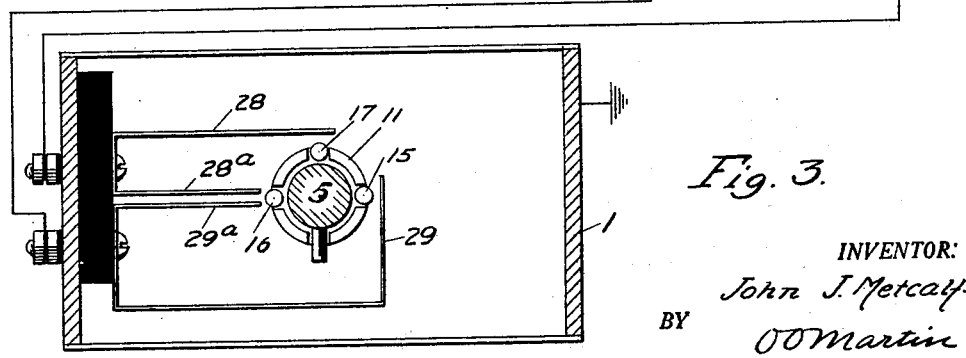
Fig. 3 is a cross sectional plan view of the device.

Because the groove 9 of the valve stem, in a compact structure, may come so close to the fuel passage 2 when the valve is closed, that leakage past the stem may be feared, a modified structure is illustrated in Fig. 2. In place of the groove and finger, a washer 40 is shown seated between the valve body and the magnet. The central perforation of this washer, as best shown in Fig. 4, is not completely circular but provided with parallel flats. The valve stem 36 is shown made with a reduced lower portion 37 having parallel flat sides fitting the perforation of the washer, for the purpose of maintaining the valve stem unturned.

It is to be noted that, in Fig. 2, the stem is shown merely abutting the plunger 35, the interlocking pin 7 having been omitted. This is a cheaper construction, the stem being entirely independent of the plunger, which latter merely pushes the stem upward. Otherwise the structure of Fig. 2 remains substantially as above described.

In the foregoing my aim has been to illustrate clearly the combinations forming the invention, but I reserve the right to effect such mechanical modifications as are required for manufacturing purposes.

The usual practice, in house heating, is to place the valve near the heating furnace, but the switch, which controls the operation of the solenoid magnet 7, is ordinarily located in some other part of the house. Such switch is diagrammatically shown at 25, and 19 denotes a source of electric energy in the circuit between the switch and magnet. It is common practice to place two signal lights close to such switch, as diagrammatically indicated at 26 and 27. In most cases one light is white and the other red. At the bottom of the casing, and insulated therefrom, are two contact fingers 28, 29, and these fingers are provided with extensions 28a, 29a, which latter are slightly spaced apart, intermediate the two fingers. From the fingers 28, 29 lead conductors, through sources of current, 30, 31 and the lights 26, 27 to the ground.

As the mechanism is shown set, no current passes through the signal lights, and the valve is closed. Upon pressing the switch button 25, however, the plunger and stem are pulled up and the plunger rotated to aline the pin 13 with the slot 12a. As the pin drops into this slot, it falls between the extensions 28a, 29a, thereby closing a circuit through both signal lights.

Next time the switch is closed, pin 13 becomes alined to drop into contact with the finger 28, causing the light 26 to become illuminated. On the following impulse a circuit is similarly closed through the light 27. As adjusted, both lights are illuminated when the valve is fully opened, the light 28 is active when the valve is two-thirds open, the light 27 indicates one-third open and, when the valve is closed no signal lights are illumined. But it should be clear to those versed in the art, that other signal combinations may be obtained by a relative readjustment of the stop screws 15, 16, 17.

Contrary to general practice, it is seen that the valve stem of my device reciprocates instead of rotating. Also that only one simple magnet is employed to throw this stem a uniform distance. For the purpose of controlling an ordinary heating apparatus the four positions of the valve stem, hereinbefore described are sufficient, but I wish it understood more positions may be added by increasing the number of teeth in the members 10, 11, and by adding a corresponding number of signal lights with their electrical connections.

I claim:

1. In a valve control, a casing having a transversely extending passage, a valve stem vertically extending through said passage, said valve stem being made with a transverse port for registration with said passage, a magnet for elevating said stem, mechanical means for stopping the stem on its return stroke at predetermined points for the purpose of controlling the opening of the valve, and signals actuated by said mechanical means to indicate the position of the valve.

2. In a valve control, a casing having a transverse passage, a valve stem vertically extending through said passage, said valve stem being made with a transverse port for registration with said passage, a magnet having its plunger in alinement with said valve stem for elevating said stem, mechanical means for stopping the plunger and valve stem on the return stroke at predetermined elevations for the purpose of controlling the passage through the casing, and signals actuated by said mechanical means to indicate the position of the valve.

3. In a valve having its stem reciprocable perpendicularly relative to the valve passage, said valve stem being made with a transverse port for registration with said passage, a magnet having its plunger in line with said stem for advancing the latter, a plurality of stops, and means co-operating with an element of the plunger for partially rotating the plunger at each reciprocation for the purpose of stopping the plunger and stem at the end of each reciprocation at a predetermined point controlling the opening of the valve.

4. In a valve having its stem reciprocable perpendicularly relative to the valve passage, a magnet having its plunger in line with said stem for advancing the stem, a plurality of adjustable stops, and means co-operating with an element of the plunger for partially rotating the plunger at each reciprocation for the purpose of stopping the plunger and stem at the end of each reciprocation at a predetermined point controlling the opening and closing of the valve.

5. In a valve having its stem reciprocable perpendicularly relative to the valve passage, a magnet having its plunger in line with said stem for advancing the stem, a plurality of adjustable stops, means co-operating with an element of said plunger for partially rotating the plunger at each reciprocation for the purpose of stopping the plunger and stem at the end of each reciprocation against one of said stops thereby controlling the opening of the valve, and electrical signals actuated by said element at the different positions of the plunger to indicate the position of the valve.

6. The combination with a vertically reciprocatory valve stem and a solenoid plunger for advancing said stem, of a pair of crenelated members encompassing said plunger, said members having opposed inclined crown surfaces engageable by an element of said plunger for the purpose of partially rotating the plunger at each reciprocation, and adjustable stops at the bottom of the lower crenelations engageable by said element for the purpose of controlling the valve opening.

7. The combination with a vertically reciprocatory valve stem and a solenoid plunger for advancing said stem, of a pair of crenelated sleeves encompassing said plunger, said sleeves having their opposed top surfaces inclined in opposite directions, the plunger having an element for engaging said surfaces and imparting a partial rotation to the plunger at each reciprocation, adjustable stops at the bottom of the lower crenelations and engageable by said element to control the valve opening, signal circuits, and contacts engageable by said element for the purpose of energizing each circuit to indicate the position of the valve.

8. A casing having a transverse passage, a valve stem vertically slidable through said passage and having a transverse port for registration with said passage, a solenoid plunger for elevating said stem, stops of increasing height at the bottom of the casing for engagement by an element of the plunger to arrest the plunger and stem on the return stroke at different points of port registration, means co-operating with said element progressively to turn the plunger in line with said stops, and signal circuits closed by said element.

9. In a valve control, a casing having a transverse fuel passage and provided with a cylindrical bore perpendicular to said passage, a valve stem slidable in said bore and having a transverse port for registration with said passage, said stem terminating at the bottom in a flattened projection, a disk fastened to the bottom of the casing and having a perforation of a size to receive said projection for the purpose of maintaining the stem unturned, a magnet at the bottom of the casing in alinement with said disk and stem projection, a plunger slidable within said magnet, means for imparting a partial rotation to said plunger at each reciprocation thereof, said means provided with stops for the plunger at different heights, and resilient means urging the stem and plunger against said stops.

10. In a valve control, a casing provided with a transverse horizontally directed fuel passage and made with a vertically directed cylindrical bore intersecting said passage, a valve stem fitted to slide within said bore and having a transverse port for registration with said passage, means to reciprocate said valve stem, and a cooperating adjustable means for stopping the valve stem at a predetermined height at the end of each reciprocation, the said casing being made at the top with a cylindrical chamber encompassing the valve stem of a size to hold a relatively large quantity of suitable lubricant.

In testimony whereof I have hereunto affixed my signature.

JOHN J. METCALF.